United States Patent
Ohkubo et al.

(10) Patent No.: US 6,742,408 B2
(45) Date of Patent: Jun. 1, 2004

(54) BALL SCREW MECHANISM

(75) Inventors: Tsutomu Ohkubo, Gunma (JP); Takeshi Nakazawa, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/254,672

(22) Filed: Sep. 26, 2002

(65) Prior Publication Data

US 2003/0024337 A1 Feb. 6, 2003

Related U.S. Application Data

(63) Continuation of application No. 09/693,980, filed on Oct. 23, 2000.

(30) Foreign Application Priority Data

Oct. 22, 1999 (JP) ........................................ P. 11-301473

(51) Int. Cl.⁷ .............................................. F16H 25/24
(52) U.S. Cl. .................... 74/424.86; 74/424.88
(58) Field of Search ...................... 74/424.81, 424.82, 74/424.86, 424.87, 424.88; 384/43, 45

(56) References Cited

U.S. PATENT DOCUMENTS 2,844,044 A * 7/1958 Cole ....................... 74/424.82

6,095,009 A 8/2000 Takagi
6,113,274 A * 9/2000 Horimoto .................... 384/43
6,176,149 B1 1/2001 Misu

FOREIGN PATENT DOCUMENTS

DE 26 27 025 A1 12/1977
DE 2838329 A1 3/1980

* cited by examiner

Primary Examiner—William C. Joyce
(74) Attorney, Agent, or Firm—Sughrue Mion, PLLC

(57) ABSTRACT

Between two mutually adjoining load balls 5, there is interposed a retaining piece 10 having two concave surfaces 11 which are respectively opposed to the two adjoining load balls 5. The retaining piece 10 has an outside diameter dimension equal to or more than 0.5 times the outside diameter dimension of the load ball 5. Further, the retaining piece 10 has an outside diameter dimension which, when the retaining piece 10 passes through a screw groove circulation passage and a tube circulation passage, prevents the retaining piece 10 from touching the inner walls of these screw groove circulation passage and tube circulation passage, or has an outside diameter dimension which is equal to or less than 0.9 times the outside diameter dimension of the load ball. Accordingly, it is possible to provide a ball screw mechanism which can prevent a retaining piece from interfering with the inner walls of circulation passages to circulate load balls stably to thereby prevent variations in torque as well as prevent the wear of the retaining piece to thereby enhance the durability thereof.

8 Claims, 11 Drawing Sheets

AN EXAMPLE IN WHICH RETAINING PIECE OUTSIDE DIAMETER IS EQUAL TO OR MORE THAN 0.5 TIMES Dw

FIG.4(b)

AN EXAMPLE IN WHICH RETAINING PIECE OUTSIDE DIAMETER IS EQUAL TO OR MORE THAN 0.5 TIMES Dw

PRIOR ART

BALL SCREW MECHANISM

This is a continuation of Application Ser. No. 09/693,980 filed Oct. 23, 2000; the disclosure of which is incorporated herein by reference.

BACKGROUND OF THE INVENTION

The present invention relates to a ball screw mechanism in which, even when a retaining piece is interposed between two mutually adjoining load balls, decrease in the number of load balls can be controlled as much as possible to thereby prevent the load balls from degrading the load capacity and rigidity thereof, can reduce friction between the load balls and retaining piece to thereby enhance the circulating performance of the retaining piece, and can prevent the load balls from butting against each other to thereby prevent degradation in the operation efficiency thereof, deterioration in the quality of sounds generated, and the friction and damage of the load balls.

Figure 9:
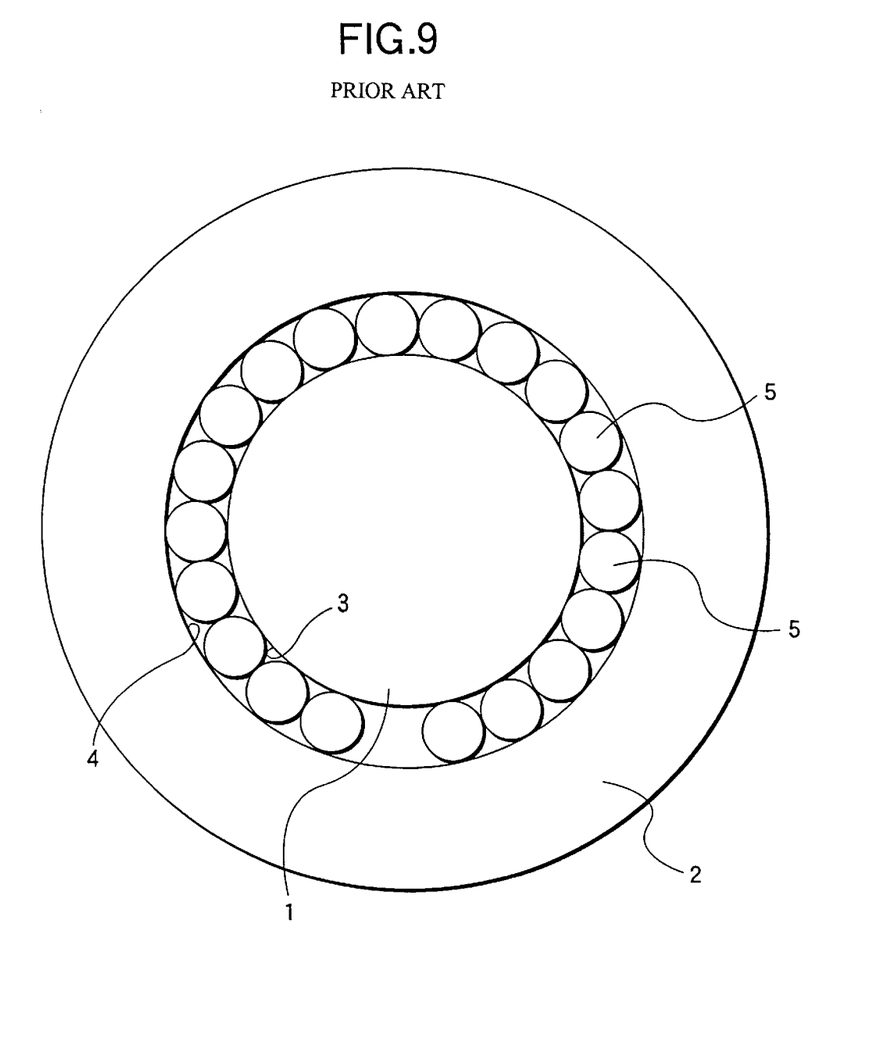
FIG. 9 is a side view of a first conventional ball screw mechanism.

Conventionally, in a ball screw mechanism, as shown in FIG. 9, on the outer peripheral surface of a screw shaft 1 and on the inner peripheral surface of a nut 2, there are respectively formed spiral-shaped screw grooves 3 and 4 which disposed opposed to each other and, in a screw groove circulation passage defined by the two screw grooves 3 and 4, there are disposed a large number of load balls 5 in such a manner that they are free to roll. In case where the screw shaft 1 and nut 2 are rotated with respect to each other to thereby move one of them in the axial direction thereof, the screw shaft 1 and nut 2 are smoothly moved in a spiral manner with respect to each other.

In such ball screw mechanism, the load balls 5 are arranged densely within the screw grooves 3 and 4 and they roll in the same direction within the individual screw grooves 3 and 4; and, in the rolling movements thereof, at contact points between the two mutually adjoining load balls 5 and 5, the load balls 5 rolling in the mutually opposite directions are contacted with each other to thereby interfere with their mutual rolling movements, with the result that the load balls 5 and 5 are caused to slip at the contact points. This interferes with the free rolling movements of the load balls 5, degrades the operation efficiency of the load balls 5, gives rise to friction and damage in the load balls 5, causes variations in the torque of the load balls 5, and swells the noises that are produced by the load balls 5.

Figure 10:
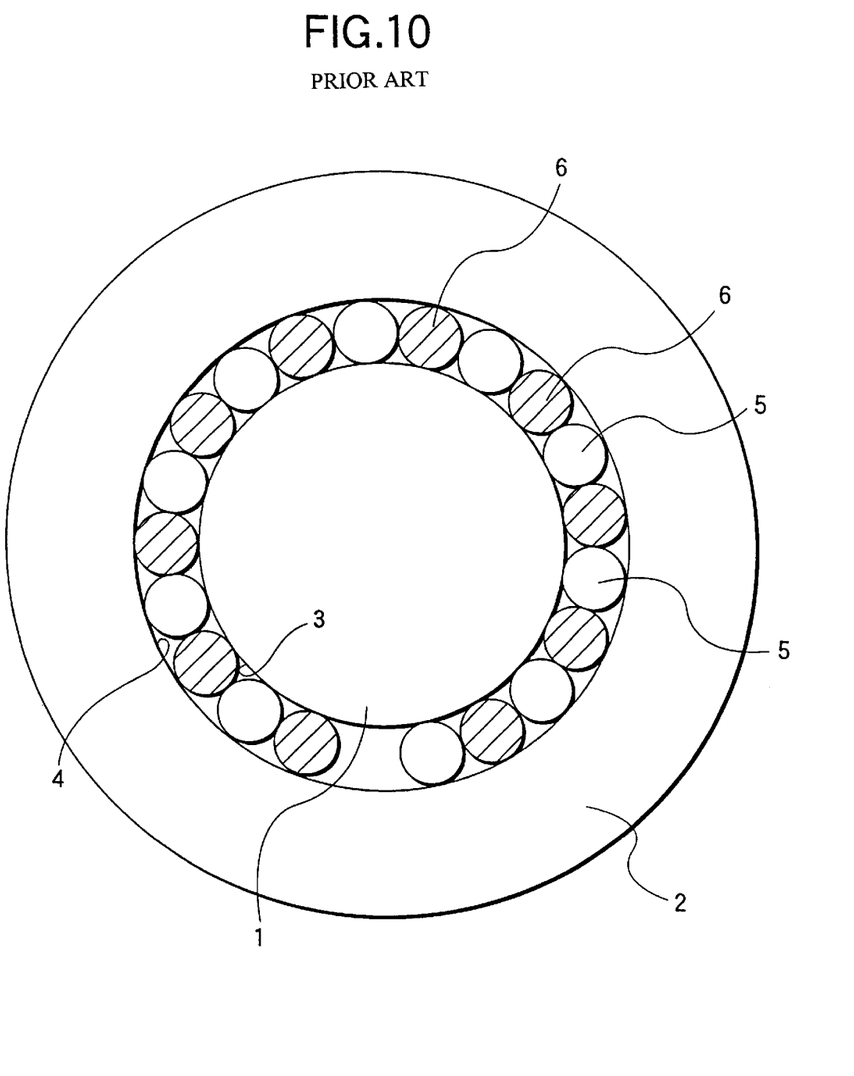
FIG. 10 is a side view of a second conventional ball screw mechanism.

To cope with these problems, as shown in FIG. 10, between the mutually adjoining load balls 5, there are respectively interposed spacer balls 6 each having a diameter smaller by several tens $\mu$ than the load balls 5. That is, such interposition of the spacer balls 6 prevents the load balls 5 against slippage, improves the operation efficiency of the load balls 5, and reduces the friction and damage of the load balls 5 to thereby prevent variations in the torque.

However, in the ball screw mechanism shown in FIG. 10, while the load balls 5 are, for example, ten in number, the spacer balls 6 are also, for example, ten in number. Therefore, when compared with the ball screw mechanism shown in FIG. 9, a clearance between the two adjoining load balls 5 is large and the load balls 5 are reduced in number down to about one half, which decreases the load capacity of the ball screw mechanism and also degrades the rigidity thereof.

Figure 11:
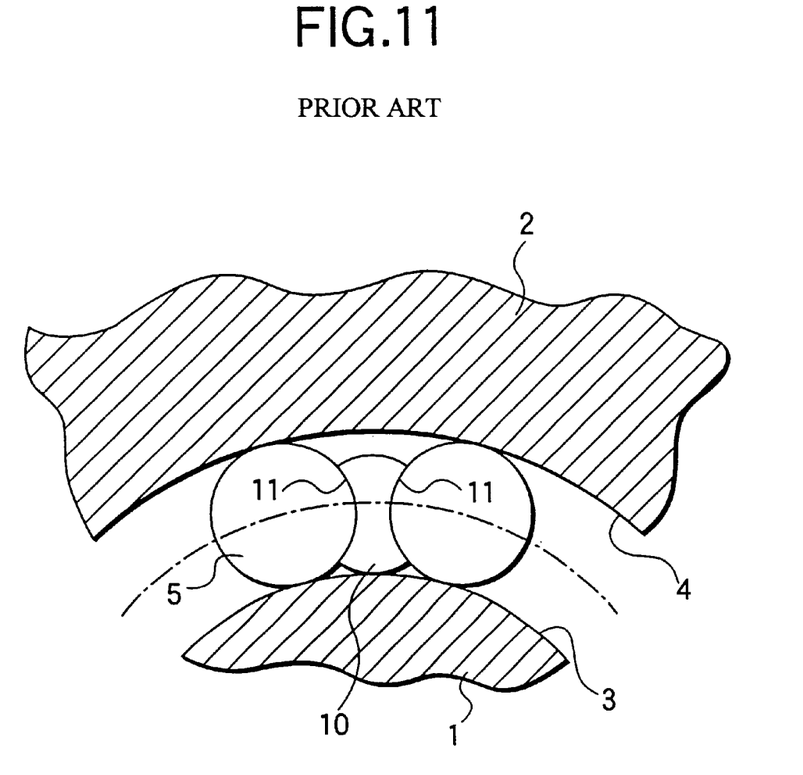
FIG. 11 is a section view of a third conventional ball screw mechanism.

In view of the above problems, there is also known a structure in which, as shown in FIG. 11, between every two mutually adjoining load balls 5, there is interposed a retaining piece 10 having two concave surfaces 11 respectively facing the two load balls 5. According to this structure, while the load balls 5 are in contact with the concave surfaces 11 of the retaining piece 10, they are allowed to circulate well within the spiral-shaped screw grooves 3 and 4. Therefore, when compared with the conventional structure using spacer balls, the spacer, that is, the retaining piece 10 can be made thinner, which makes it possible to control reduction in the number of load balls and thus avoid degradation in the load capacity and rigidity of the ball screw mechanism.

However, in the ball screw mechanism shown in FIG. 11, since the relation between the outside dimension of the retaining piece 10 and the outside dimension of the load ball 5 is not always considered properly, there is a fear that, when the retaining piece 10 passes through the spiral-shaped screw groove circulation passage and tube circulation passage, it can interfere with the inner walls of these circulation passages. Therefore, such interference makes it difficult for the load balls 5 to circulate stably, thereby giving rise to generation of variations in the torque, or causing the retaining piece 10 to wear.

SUMMARY OF THE INVENTION

The present invention aims at eliminating the drawbacks found in the above-mentioned conventional ball screw mechanisms. Accordingly, it is an object of the invention to provide a ball screw mechanism which prevents the retaining piece from interfering with the inner walls of the circulation passages to thereby allow the load balls to circulate stably, thereby preventing not only variations in the torque but also the wear of the retaining piece for enhancement of the durability of the retaining piece.

In attaining the above object, according to a first aspect of the invention, there is provided a ball screw mechanism structured such that, on the outer peripheral surface of a screw shaft and on the inner peripheral surface of a nut, there are respectively formed mutually facing spiral-shaped screw grooves, there are rollably disposed a large number of load balls in a spiral-shaped screw groove circulation passage formed by these two screw grooves, and, to the screw groove circulation passage, there is continuously connected a return circulation passage through which load balls taken out from the screw groove circulation passage can be returned again into the screw groove circulation passage, wherein, between every two mutually adjoining ones of the large number of load balls, there is interposed a retaining piece having two concave surfaces respectively facing the two mutually adjoining load balls, the retaining piece has an outside diameter dimension equal to or more than 0.5 times the outside diameter dimension of the load ball, and the retaining piece has an outside diameter dimension which, when the retaining piece passes through the screw groove circulation passage and tube circulation passage, prevents the retaining piece from touching the inner walls of the screw groove circulation passage and tube circulation passage.

Also, according to a second aspect of the invention, there is provided a ball screw mechanism structured such that, on the outer peripheral surface of a screw shaft and on the inner peripheral surface of a nut, there are respectively formed mutually facing spiral-shaped screw grooves, there are rollably disposed a large number of load balls in a spiral-shaped screw groove circulation passage formed by these two screw grooves, and, to the screw groove circulation passage, there is continuously connected a return circulation passage through which load balls taken out from the screw groove circulation passage can be returned again into the screw groove circulation passage, wherein, between every two mutually adjoining ones of the large number of load balls, there is interposed a retaining piece having two concave surfaces respectively facing the two mutually adjoining load balls, and the retaining piece has an outside diameter dimension in the range of 0.5 to 0.9 times the outside diameter dimension of the load ball.

As described above, according to the invention, as a first condition, the retaining piece has an outside diameter dimension equal to or more than 0.5 times the outside diameter dimension of the load ball. This is basically because, in case where the retaining piece has an outside diameter dimension less than half the outside diameter dimension of the load ball, the retaining piece cannot be lifted up from between the two mutually adjoining load balls, which disables the retaining piece to fulfil the expected function thereof.

Also, as a second condition, the retaining piece has an outside diameter dimension which, when the retaining piece passes through the screw groove circulation passage and tube circulation passage, prevents the retaining piece from touching the inner walls of these screw groove circulation passage and tube circulation passage, or has an outside diameter dimension which is equal to or less than 0.9 times the outside diameter dimension of the load ball. This is basically because, to circulate the load balls stably, the concave surface holding allowance for the load balls (the steel ball holding allowance) maybe preferably set large, which increases the outside diameter of the retaining piece accordingly; but, in case where the concave surface holding allowance is excessively large, the retaining piece interferes with the inner walls of the screw groove circulation passage and return circulation passage having various curvatures, thereby degrading the operation efficiency of the retaining piece. Under these circumstances, to balance them with each other, the outside diameter of the retaining piece is set as large as possible on one side but, on the other hand, the outside diameter of the retaining piece is controlled to such a degree that it does not interfere with the inner walls of the circulation passages.

As described above, according to the invention, since, between every two mutually adjoining load balls, there is interposed a retaining piece having two concave surfaces respectively facing the two load balls, even in case where a retaining piece between two mutually adjoining load balls, the number of load balls can be reduced as many as possible without degrading the load capacity and rigidity of the ball screw mechanism; and, friction between the load balls and retaining pieces can be reduced as much as possible, so that not only the circulating performance of the retaining piece can be enhanced, but also the load balls can be prevented from butting each other, thereby preventing the degraded operation efficiency of the load balls, generation of noises by the load balls, the deteriorated quality of sounds generated by the load balls, and the friction and damage of the load balls.

In addition, because the relation between the outside diameter dimension of the retaining piece and the outside diameter dimension of the load balls is properly considered, the interference of the retaining pieces with the inner walls of the circulation passages can be prevented, thereby allowing the load balls to circulate stably. This can prevent variations in torque as well as can prevent the wear of the retaining pieces to thereby enhance the durability thereof.

DETAILED DESCRIPTION OF THE PREFERRED EMBODIMENTS

Now, description will be given below of the preferred embodiments of a ball screw mechanism according to the invention with reference to the accompanying drawings.

Prior to description of the preferred embodiments of a ball screw mechanism according to the invention, the number of load balls, the number of retaining pieces and the clearance relation between the load balls and retaining pieces will be discussed with reference to FIG. 8.

Figure 8A:
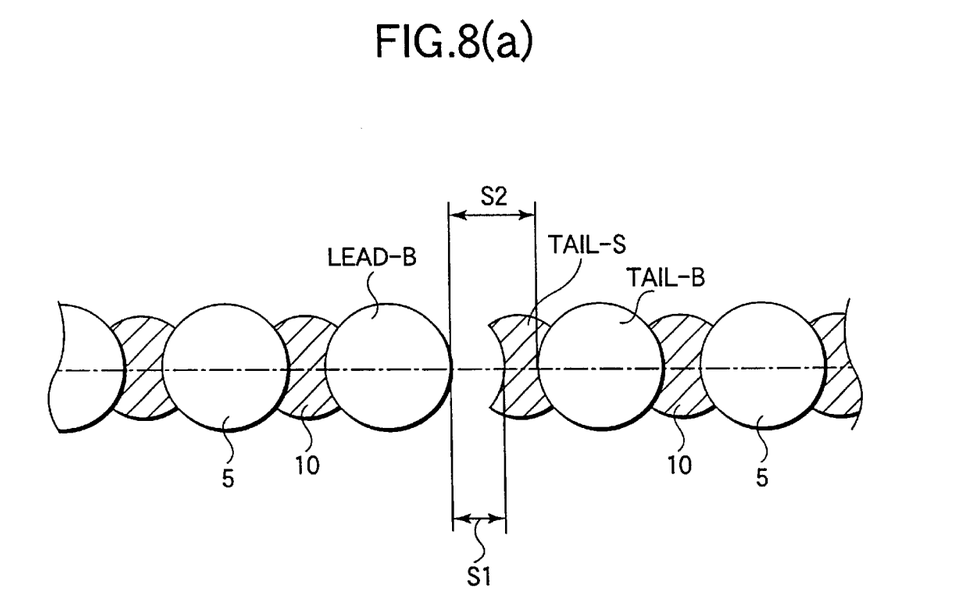
FIG. 8(a) is an explanatory view of the principle of a ball screw mechanism according to an embodiment of the invention.
Figure 8B:
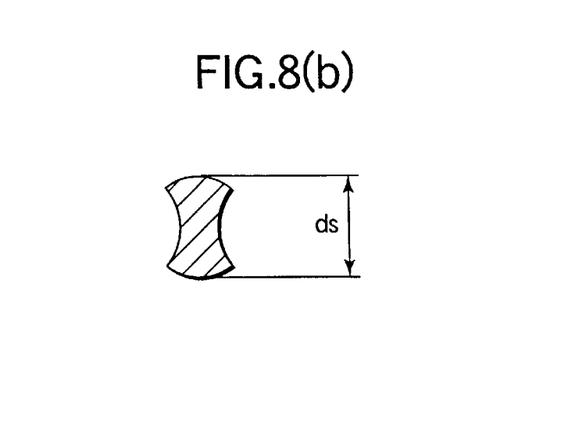
FIG. 8(b) is a section view of a retaining piece employed in the embodiment.

Now, FIG. 8(a) is an explanatory view of the principle of a ball screw mechanism according to an embodiment of the invention, and FIG. 8(b) is a section view of a retaining piece employed in the embodiment.

The numbers of load balls 5 and retaining pieces 10 are respectively set in the following manner that, as shown in FIG. 8(a), when it is assumed that all the balls 5 and all the retaining pieces 10 inserted into a spiral-shaped circulation passage formed by screw grooves 3 and 4 are gathered to one side, a clearance formed between a load ball (LEAD-B) positioned at the head and a retaining piece (TAIL-S) positioned at the tail is defined as a total clearance; and, when it is assumed that the total clearance (S1) is larger than zero (that is, S1>0) and the tail-positioned retaining piece (TAIL-S) is removed, a clearance (S2) between the head load ball (LEAD-B) and the tail load ball (TAIL-B) is smaller than 0.8 times the diameter (ds, see FIG. 8(b)) of the retaining piece (that is, S2<0.8×ds).

As described above, the distance (S1) of the total clearance of the circulation passage is set such that S1>0, and, when one retaining piece (TAIL-S) is removed, the clearance (S2) between the head load ball (LEAD-B) and the tail load ball (TAIL-B) is set such that S2<0.8×ds. Therefore, there are no possibilities that, because the clearance within the circulation passage is excessively large, the retaining pieces 10 can be caused to fall down and that, since the clearance within the circulation passage is excessively small, the load balls 5 and retaining pieces 10 are rubbed against each other to thereby give rise to the poor operation of the load balls 5 and retaining pieces 10: that is, the two kinds of clearances (S1, S2) within the circulation passage are set properly. Thanks to this, there is no fear that the retaining pieces 10 can fall down further than an angle of 60°, which makes it possible to maintain the per operating performance of the load balls 5 and retaining pieces 10.

Next, in the present embodiment, the outside dimension and shape of the retaining piece are defined with above-mentioned conditions taken into account.

Figure 1:
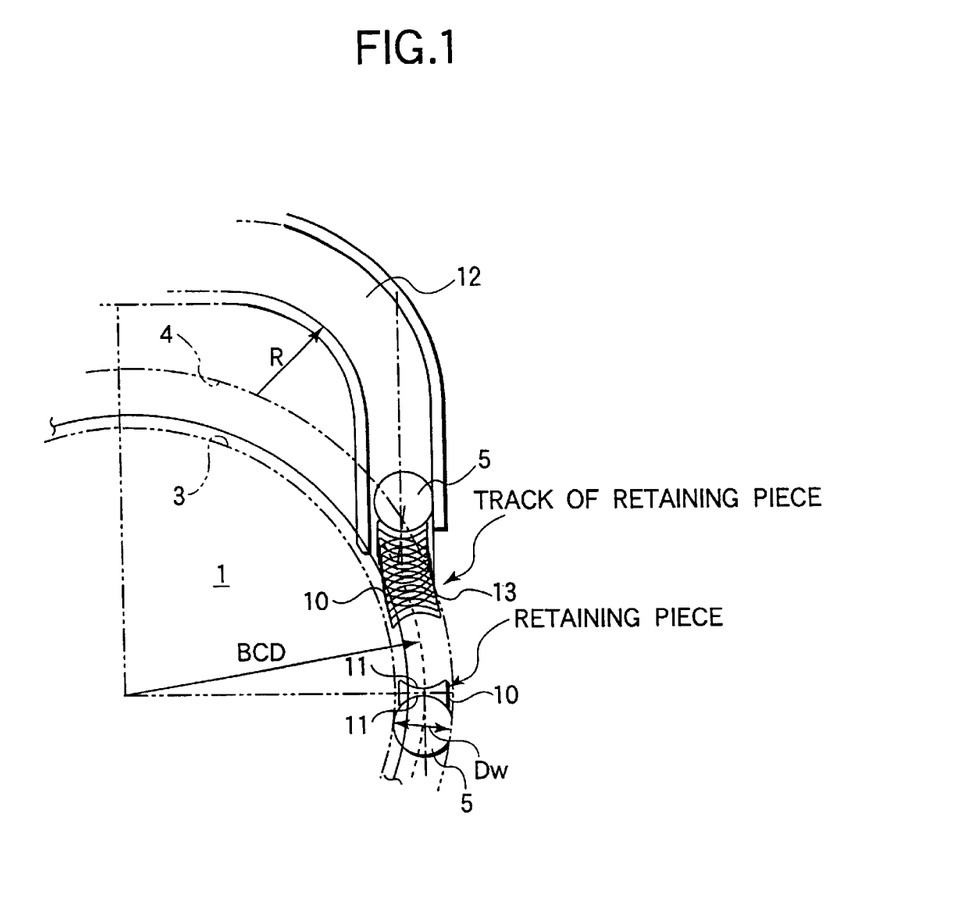
FIG. 1 is a typical view of a ball screw mechanism according to an embodiment of the invention.
Figure 2:
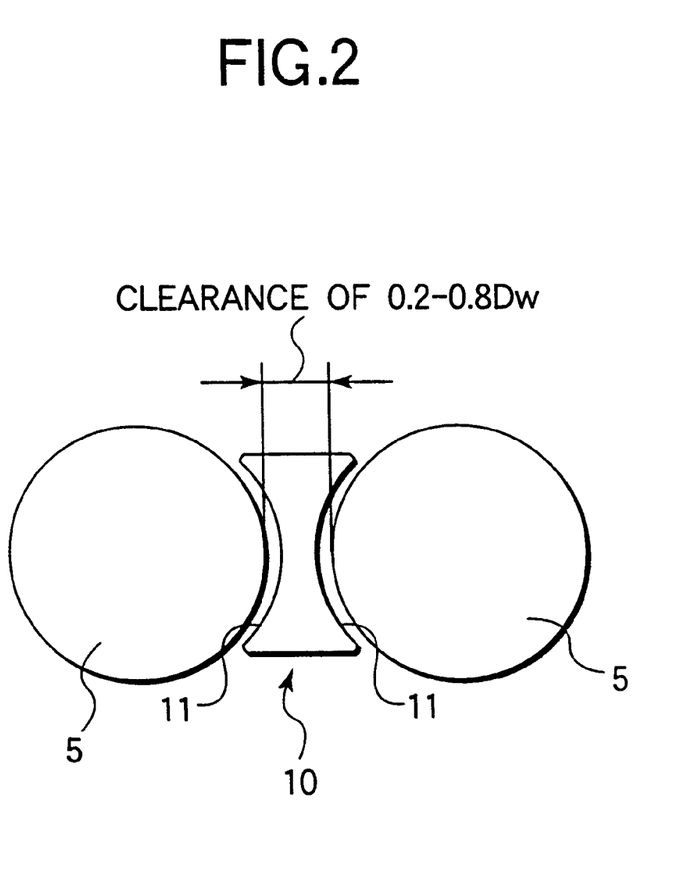
FIG. 2 is a typical view of a state of a retaining piece and its two adjoining load balls when there exist clearances respectively between the retaining piece and two load balls.
Figure 3:
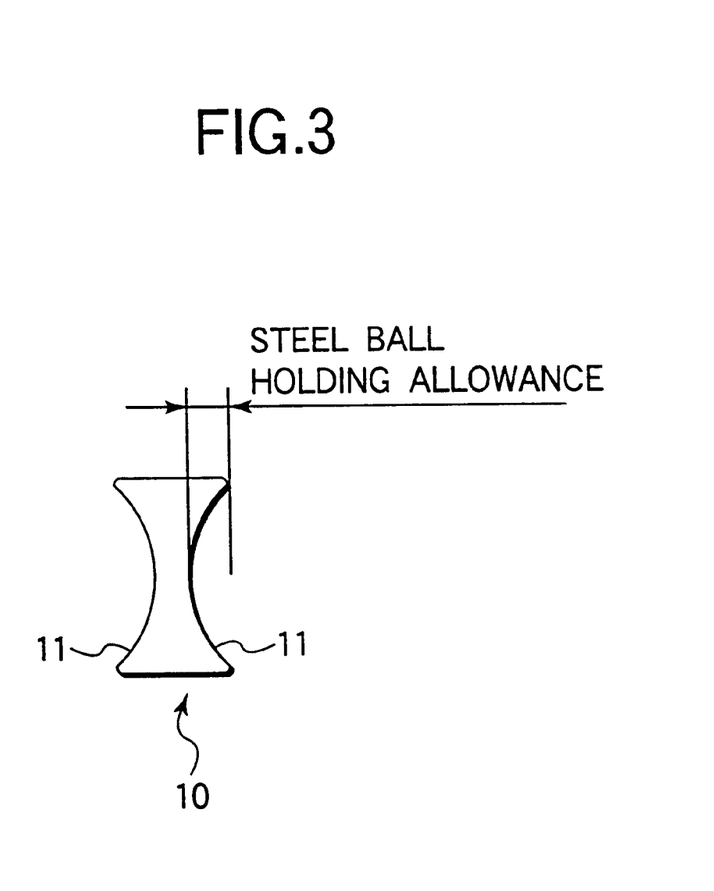
FIG. 3 is a typical view the shape of the side surfaces of the retaining piece.
Figure 4A:
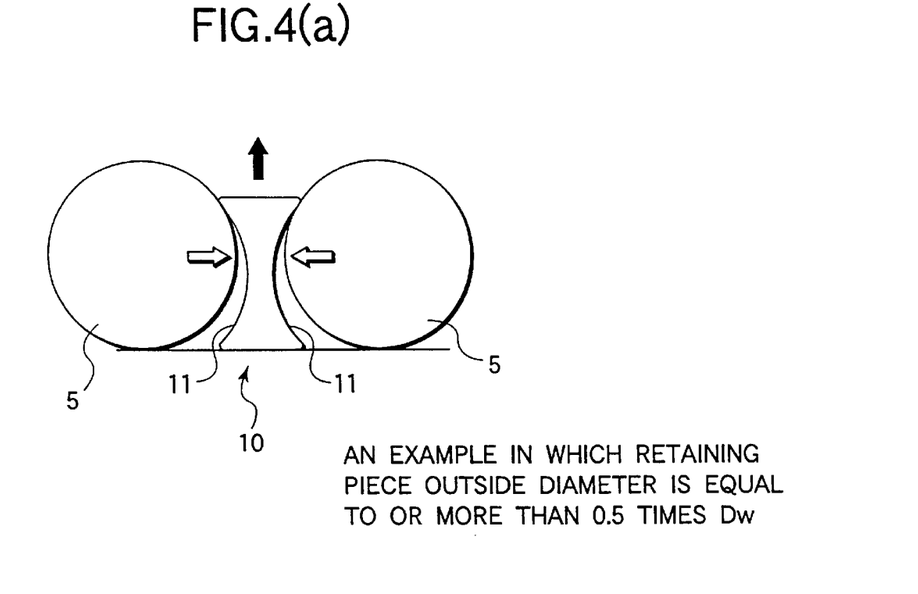
FIG. 4(a) is a typical view of a state of the retaining piece and two load balls when the outside dimension (ds) of the retaining piece is equal to or more than 0.5 times the outside dimension (Dw) of the load ball.
Figure 4B:
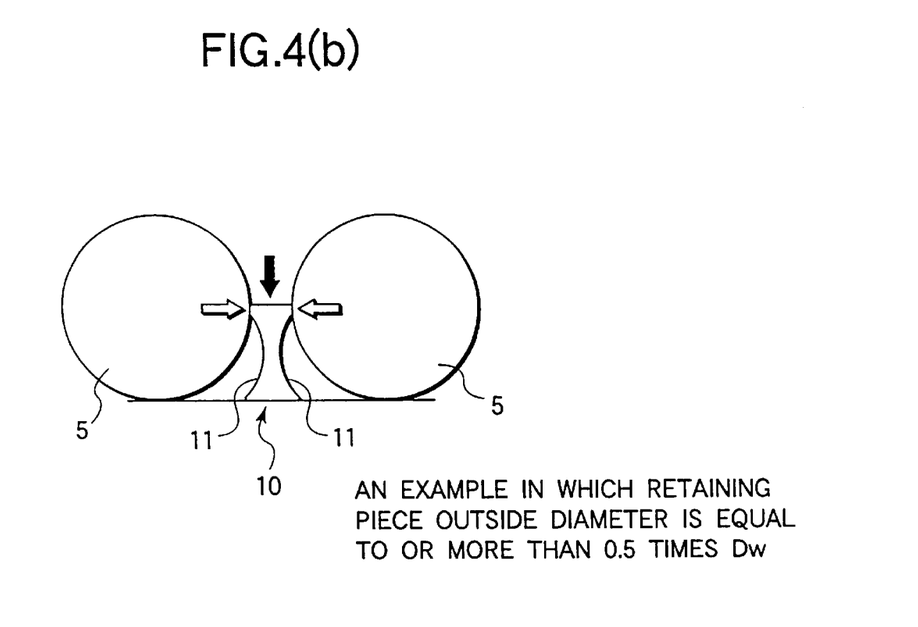
FIG. 4(b) is a typical view of a state of the retaining piece and two load balls when the outside dimension (ds) of the retaining piece is equal to or less than 0.5 times the outside dimension (Dw) of the load ball.
Figure 5:
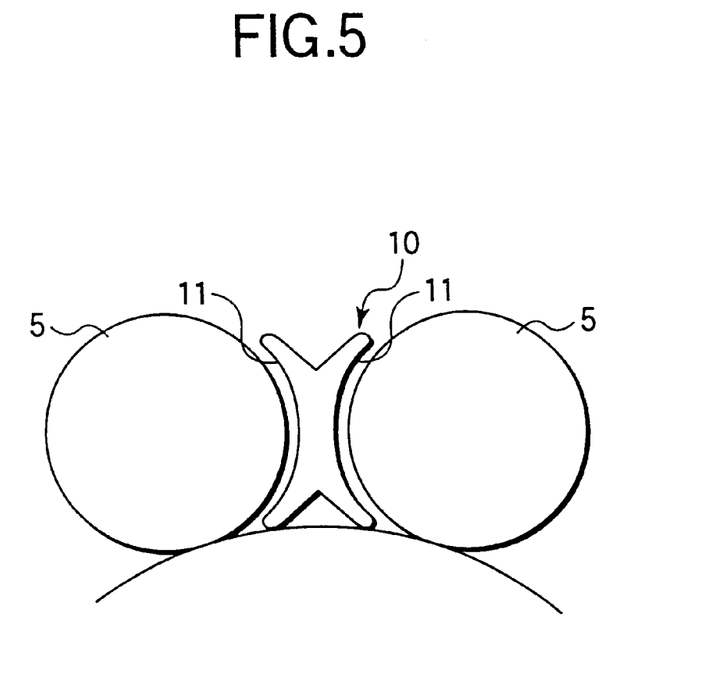
FIG. 5 is a typical view of a modification of the above embodiment of a retaining piece according to the invention.

Now, FIG. 1 is a typical view of a ball screw mechanism according to the present embodiment of the invention; FIG. 2 is a typical view of a state of a retaining piece and two load balls when there exist clearances respectively between the retaining piece and two load balls; FIG. 3 is a typical view of the shape of the side surfaces of the retaining piece; FIG. 4(a) is a typical view of a state of the retaining piece and two load balls when the outside dimension (ds) of the retaining piece is equal to or larger than 0.5 times the outside dimension (Dw) of the load ball; FIG. 4(b) is a typical view of a state of the retaining piece and two load balls when the outside dimension (ds) of the retaining piece is equal to or smaller than 0.5 times the outside dimension (Dw) of the load ball; and, FIG. 5 is a typical view of a modification of the retaining piece according to the second embodiment.

In the present embodiment, as a first condition, the retaining piece 10 has an outside dimension which is equal to or larger than 0.5 times the outside dimension (Dw) of the load ball 5.

The reason why the first condition is established is as follows: that is, in a ball screw mechanism with retaining pieces contained therein, since the total clearance exists in the above-mentioned manner, all the retaining pieces 10 are not restricted completely between their respective adjoining load balls 5 but some of the retaining pieces 10, as shown in FIG. 2, are held in a free state (a state which there exists clearances respectively between a retaining piece and two adjoining load balls) within the circulation passage; and, to return the retaining piece 10 from the free state to the normal state in which the retaining piece 10 is tightly held by and between its adjoining load balls 5, it is necessary that, as shown in FIG. 4(a), the retaining piece 10 has an outside diameter dimension equal to or more than 0.5 times the outside diameter dimension Dw. In other words, when the load balls 5 and retaining piece 10 are arranged within the circulation passage in order of load ball 5—retaining piece 10—load ball 5, if the height of the retaining piece 10 does not exist above a line which connects together the centers of the two loadballs 5, as shown in FIG. 4(b), there does not operate a force which lifts the retaining piece 10 up to its normal position, so that the retaining piece 10 is unable to fulfil its function.

Next, in the present embodiment, as a second condition, the retaining piece 10 has an outside diameter dimension which, when the retaining piece 10 passes through a screw groove circulation passage and a tube circulation passage, prevents the retaining piece 10 from touching the inner walls of these screw groove circulation passage and tube circulation passage, or has an outside diameter dimension which is equal to or less than 0.9 times the outside diameter dimension of the load ball 5.

(A) As a first reason for the second condition, to secure a concave surface holding allowance for the load ball 5 (a steel ball holding allowance, FIG. 3), it is necessary that the outside diameter of the retaining piece 10 is set as large as possible.

That is, to circulate the retaining piece 10 stably in a state where it is held by and between its adjoining load balls 5, it is necessary that the concave surface holding allowance for the load ball 5 (the steel ball holding allowance, FIG. 3) is set large. However, when the concave surface holding allowance (the steel ball holding allowance) is set large, the outside diameter of the retaining piece 10 increases.

(B) As a second reason for the second condition, it is necessary to prevent the retaining piece 10 from interfering with the inner walls of the circulation passages which have various curvatures.

That is, in the case of a ball screw mechanism of a tube type, there are present a screw groove circulation passage for receiving loads and a tube circulation passage (a return circulation passage) for returning load balls. The screw groove circulation passage has a given curvature and, at the same time, the tube circulation passage, as shown in FIG. 1, has given curvatures respectively in a bent portion 12 and a ball scoop-up portion 13. And, it is necessary to prevent the retaining piece 10 from interfering with the inner walls of the circulation passages having various curvatures. For example, as there is shown a continuous track of the retaining piece 10 in FIG. 1, it is necessary for the retaining piece 10 to pass through the ball scoop-up portion 13 without interfering with the inner walls thereof.

As described above, to circulate the load balls 5 stably, the concave surface holding allowance for the load ball 5 (the steel ball holding allowance, FIG. 3) may be preferably set large and, in this case, the outside diameter of the retaining piece 10 is set large accordingly. However, in case where the outside diameter of the retaining piece 10 is excessively large, the retaining piece 10 interferes with the inner walls of the screw groove circulation passage and return circulation passage having various curvatures, which degrades the operation efficiency of the retaining piece 10. Under these circumstances, to balance them with each other, the outside diameter of the retaining piece 10 is set as large as possible on one side but, on the other hand, it is controlled such that the retaining piece 10 does not interfere with the inner walls of the circulation passages. That is, the second condition is defined such that the retaining piece 10 has an outside diameter dimension which, when the retaining piece 10 passes through a screw groove circulation passage and a tube circulation passage, prevents the retaining piece 10 from touching the inner walls of these screw groove circulation passage and tube circulation passage, or has an outside diameter dimension which is equal to or less than 0.9 times the outside diameter dimension of the load ball 5.

Next, as shown in FIGS. 1 to 4, referring to the shape of the retaining piece 10, the retaining piece 10 includes two concave surfaces 11 respectively facing the two adjoining load balls 5, while the outer peripheral surface of the retaining piece 10 in the diameter direction thereof is set flat. Thanks to this shape, the retaining piece 10 is allowed to pass through the screw groove circulation passage and tube circulation passage without interfering with the inner walls of these circulation passages.

Also, referring to the shape of the retaining piece 10, the retaining piece 10, as shown in FIG. 5, the diameter-direction outer peripheral surface thereof may also be formed as a triangular-shaped concave shape. In this case, there can be obtained the same effect as the outside diameter of the retaining piece 10 is reduced, so that while the concave surface holding allowance (the steel ball holding allowance) is set large, it is possible to prevent the retaining piece 10 from interfering with the inner walls of the bent portion 12 and ball scoop-up portion 13 of the tube circulation passage.

Further, as shown in FIG. 1, the bend R of the bent portion 12 of the tube circulation passage may also be set in the following manner.

That is, $R \approx (BCD-Dw)/2$
where ($\approx$ is the Japanese symbol having the same meaning as the more common English symbol≈), BCD expresses a load ball pitch circle diameter, Dw expresses a load ball outside diameter, and (BCD−Dw) expresses a groove bottom diameter. In this manner, by setting the bend R (that is, a radius curvature) of the bent portion 12 of the tube circulation passage relatively large, the retaining piece 10 can be prevented from interfering with the bent portion 12, which makes it possible to circulate the retaining piece 10 stably.

By the way, in case where the distance between the load balls 5 is set large, when the balls 5 pass through the bent portion of the tube circulation passage, there is provided the same tendency as the outside diameter of the retaining piece 10 is set large. Here, by setting the distance between the load balls 5 to be equal to or less than 1.3 times the outside diameter of the load ball 5, the outside diameter of the retaining piece 10 can be set in the above-mentioned range, so that the above-mentioned effect can be expected.

By the way, the present invention is not limited to the above-mentioned embodiment but there are possible various changes and modifications.

Embodiment

Now, FIG. 1 shows an inserted state of a retaining piece 10 at a section thereof substantially perpendicular to the axial direction thereof when the retaining piece 10 is inserted into a ball screw mechanism in which a load ball (steel ball) diameter is 3.175 mm, a ball screw axial diameter is φ32 mm, and a lead is 5 mm. In this case, the retaining piece 10 has an outside diameter 90% of the outside diameter of the load ball 5, while the distance between load balls 5 is 115% of the outside diameter of the load ball 5. As can be seen from FIG. 1, the retaining piece 10 is prevented from interfering with the inner walls of the screw groove circulation passage having a given curvature and the inner walls of the bent portion 12 and ball scoop-up portion 13 of the tube circulation passage. In the case of this state, test results show that there is no problem as to the actual torque characteristic and the durability of the retaining piece.

Figure 6:
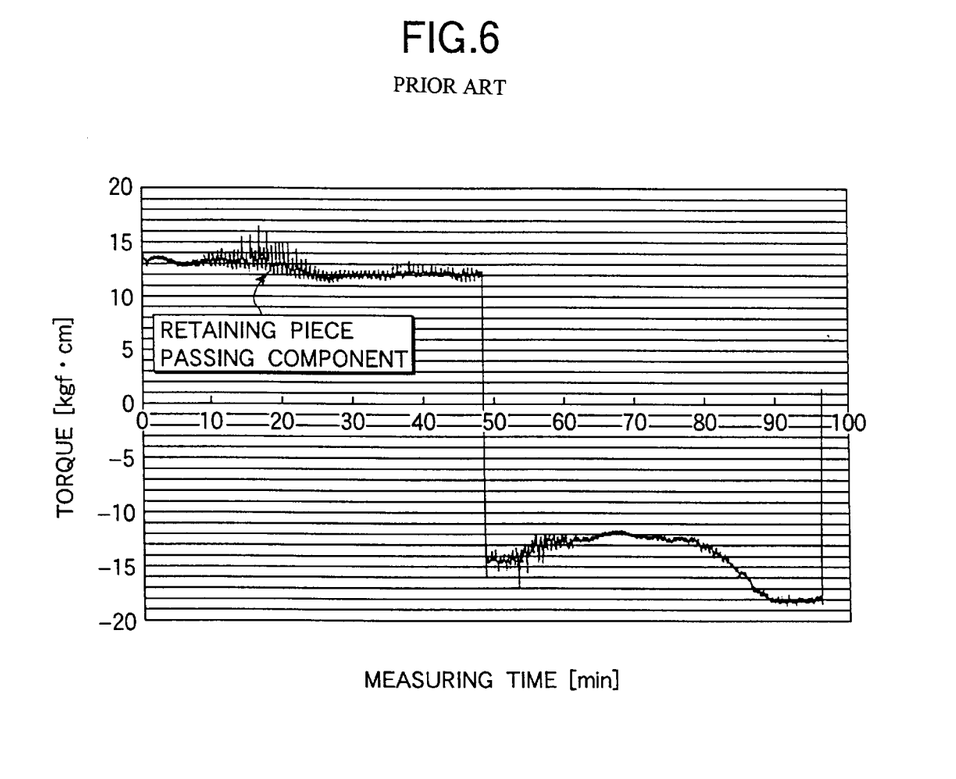
FIG. 6 is a graphical representation of the test results of the torque characteristic of a conventional ball screw mechanism when the outside diameter dimension of a retaining piece is 0.95 times the outside diameter dimension of a load ball.

Also, FIG. 6 is a graphical representation of the test results of the torque characteristic of a conventional ball screw mechanism when the outside diameter dimension of a retaining piece is 0.95 times the outside diameter dimension of a load ball. In this case, since the retaining piece 10 interferes with the bent portion 12 of the tube circulation passage, there is found an increase (beard) in the torque at a cycle where the retaining piece 10 passes through the bent portion 12.

Figure 7:
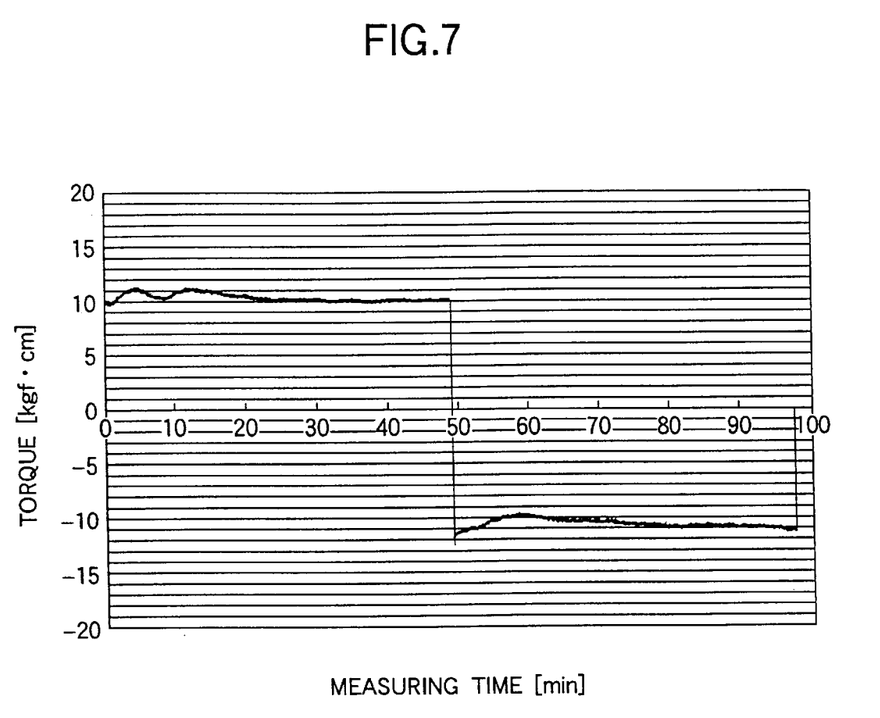
FIG. 7 is a graphical representation of the test results of the torque characteristic of a ball screw mechanism according to the invention when the outside diameter dimension of a retaining piece is 0.9 times the outside diameter dimension of a load ball.

Further, FIG. 7 is a graphical representation of the test results of the torque characteristic of a ball screw mechanism according to the invention when the outside diameter dimension of a retaining piece is 0.9 times the outside diameter dimension of a load ball. In this case, the retaining piece 10 does not interfere with the bent portion 12 of the tube circulation passage, nor there is caused an increase (beard) in the torque when the retaining piece 10 passes through the bent portion 12. That is, it can be seen that the torque characteristic of the present ball screw mechanism is improved.

As has been described heretofore, according to the invention, since, between every two mutually adjoining load balls, there is interposed a retaining piece which has two concave surfaces respectively facing these two load balls, even in case where a retaining piece is interposed between its two mutually adjoining load balls, reduction in the number of load balls can be controlled as much as possible to thereby prevent degradation in the load capacity and rigidity of the ball screw mechanism; and, friction between the load balls and retaining pieces can be reduced as much as possible to thereby enhance the circulation performance of the retaining pieces. Also, the load balls are prevented from butting against each other, which can prevent the degraded operation efficiency of the load balls, generation of noises, deterioration in the quality of sounds generated, and the friction and damage of the load balls.

In addition, because the relation between the outside diameter dimension of the retaining piece and the outside diameter dimension of the load balls is properly considered, the interference of the retaining pieces with the inner walls of the circulation passages can be prevented to thereby circulate the load balls stably. This can prevent variations in torque as well as can prevent the wear of the retaining pieces to thereby enhance the durability thereof.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball screw mechanism comprising:
   a screw shaft having a spiral-shaped screw groove on its outer peripheral surface;
   a nut member having a spiral-shaped screw groove on its inner peripheral surface mutually facing said spiral-shaped screw groove of said screw shaft;
   a plurality of load balls disposed in a spiral-shaped screw groove circulation passage formed by said mutually facing screw grooves and also in a return circulation passage which is formed in said nut member and is continuously connected to said spiral-shaped screw groove circulation passage, wherein said load balls taken out from said screw groove circulation passage can be returned again into said screw groove circulation passage through said return circulation passage;
   a plurality of retaining pieces each interposed between every two mutually adjoining ones of said load balls, said retaining piece having two concave surfaces respectively facing said two load balls and also an outside diameter dimension in the range from 0.5 to 0.9 times the outside diameter dimension of said load ball,
   wherein a radius of curvature of a bent portion in said return circulation passage satisfies a following equation $R \approx (BCD-DW)/2$ where R defines the radius curvature, BCD expresses a load ball pitch circle diameter, and Dw expresses a load ball outside diameter.

2. A ball screw mechanism comprising:

a screw shaft having a spiral-shaped screw groove on its inner peripheral surface;

a nut member having a spiral-shaped screw groove on its on its inner peripheral surface mutually facing said spiral-shaped screw groove of the screw shaft;

a plurality of load balls disposed in a spiral-shaped screw groove circulation passage formed by said mutually facing screw grooves and also in a return circulation passage which is formed in said nut member and is continuously connected to said spiral-shaped screw groove circulation passage, wherein said load balls taken out from said screw groove circulation passage can be returned again into said screw groove circulation passage through said return circulation passage, wherein, between every two mutually adjoining ones of said load balls, there is interposed a retaining piece having two concave surfaces respectively facing said two load balls, said retaining piece has an outside diameter dimension equal to or more than 0.5 times the outside diameter dimension of said load ball, and said retaining piece has an outside diameter dimension which, when said retaining piece passes through said screw groove circulation passage and said tube circulation passage, prevents said retaining piece from touching the inner walls of said screw groove circulation passage and said return circulation passage, wherein a radius of curvature of a bent portion in said return circulation passage satisfies a following equation $$R \approx (BCD - Dw)/2$$

where R defines the radius curvature, BCD expresses a load ball pitch circle diameter, and Dw expresses a load ball outside diameter.

3. The ball screw mechanism of claim 2, wherein said plurality of load balls and said plurality of retaining pieces comprise such a number so as to satisfy the following equations:

$$S1 > 0; \text{ and}$$

$$S2 < 0.8 \times ds,$$

wherein, when all the load balls and all the retaining pieces are gathered to one side so as to form a continuous chain, S1 is a clearance formed between a load ball positioned at a head of the chain and a tail retaining piece positioned at a tail of the chain, S2 is a clearance between the head load ball and a tail load ball when the tail retaining piece is removed, and ds is the diameter of the retaining piece.

4. The ball screw mechanism of claim 2, wherein said retaining piece is shaped as a sphere, and said two concave surfaces are opposite one another.

5. The ball screw mechanism of claim 2, wherein said retaining piece is X-shaped in cross section.

6. The ball screw mechanism of claim 2, wherein said retaining piece is shaped as a cylinder and said two concave surfaces are opposite one another.

7. The ball screw mechanism of claim 2, wherein said retaining piece, in cross section, comprises rounded corners.

8. A ball screw mechanism comprising:

a screw shaft having a spiral-shaped screw groove on its outer peripheral surface;

a nut member having a spiral-shaped screw groove on its inner peripheral surface mutually facing said spiral-shaped screw groove of said screw shaft;

a plurality of load balls disposed in a spiral-shaped screw groove circulation passage formed by said mutually facing screw grooves and also in a return circulation passage which is formed in said nut member and is continuously connected to said spiral-shaped screw groove circulation passage, wherein said load balls taken out from said screw groove circulation passage can be returned again into said screw groove circulation passage through said return circulation passage;

a plurality of retaining pieces each interposed between every two mutually adjoining ones of said load balls, said retaining piece having two concave surfaces respectively facing said two load balls and also an outside diameter dimension in the range from 0.5 to 0.9 times the outside diameter dimension of said load ball, wherein said plurality of load balls and said plurality of retaining pieces comprise such a number so as to satisfy the following equations:

$$S1 > 0; \text{ and}$$

$$S2 < 0.8 \times ds,$$

wherein, when all the load balls and all the retaining pieces are gathered to one side so as to form a continuous chain, S1 is a clearance formed between a load ball positioned at a head of the chain and a tail retaining piece positioned at a tail of the chain, S2 is a clearance between the head load ball and a tail load ball when the tail retaining piece is removed, and ds is the diameter of the retaining pieces.

* * * * *